US008634643B2

United States Patent
Lin

(10) Patent No.: US 8,634,643 B2
(45) Date of Patent: Jan. 21, 2014

(54) IMAGE ADJUSTMENT METHOD

(75) Inventor: Pao-Yen Lin, Hsinchu (TW)

(73) Assignee: Novatek Microelectronics Corp., Hsinchu (TW)

(*) Notice: Subject to any disclaimer, the term of this patent is extended or adjusted under 35 U.S.C. 154(b) by 126 days.

(21) Appl. No.: 13/298,296

(22) Filed: Nov. 17, 2011

(65) Prior Publication Data

US 2013/0051669 A1 Feb. 28, 2013

(30) Foreign Application Priority Data

Aug. 29, 2011 (TW) .............................. 100130920 A

(51) Int. Cl.
*G06K 9/00* (2006.01)
(52) U.S. Cl.
USPC .......................................................... 382/169
(58) Field of Classification Search
None
See application file for complete search history.

(56) References Cited

U.S. PATENT DOCUMENTS

| 7,197,526 | B1 * | 3/2007 | Qu ................................ | 708/491 |
|---|---|---|---|---|
| 2004/0257625 | A1 * | 12/2004 | Tonami ........................ | 358/3.28 |
| 2006/0233422 | A1 * | 10/2006 | Toyama ........................ | 382/103 |
| 2009/0232409 | A1 * | 9/2009 | Marchesotti .................. | 382/254 |

OTHER PUBLICATIONS

Wikipedia, Histogram Equalization, published online on Apr. 22, 2010.*

* cited by examiner

*Primary Examiner* — Bhavesh Mehta
*Assistant Examiner* — Feng Niu
(74) *Attorney, Agent, or Firm* — Jianq Chyun IP Office

(57) ABSTRACT

An image adjustment method is disclosed. The steps of the method include: receiving an image data having a plurality of original pixels, the number of the original pixels is equal to Num1, and $2^{N-1} \leq Num1 \leq 2^N -1$, wherein N and Num1 are natural numbers; adding a plurality of expanding pixels to the image data, such that a sum of the original pixels and the expanding pixels is equal to $2^N-1$; calculating a plurality of cumulative pixel numbers corresponding to a plurality of gray levels, wherein each of the cumulative pixel numbers is not larger than the number of the original pixels and the expanding pixels corresponding to each of the gray levels; and tuning the gray levels of the original pixels according to the corresponding relationship between the gray levels and the cumulative pixel numbers.

13 Claims, 5 Drawing Sheets

IMAGE ADJUSTMENT METHOD

CROSS-REFERENCE TO RELATED APPLICATION

This application claims the priority benefit of Taiwan application serial no. 100130920, filed on Aug. 29, 2011. The entirety of the above-mentioned patent application is hereby incorporated by reference herein and made a part of this specification.

BACKGROUND OF THE INVENTION

1. Field of the Invention

The present invention relates to an image adjustment method, and more particularly, to an image adjustment method capable to effectively apply the gray level range.

2. Description of Related Art

In the related art of the image adjustment method technique, the technique of image adjustment method according to the characteristics of color and/or brightness of the display image is proposed, i.e., the method of histogram equalization. The histogram equalization method can be described as the following mathematic equation (1):

$$F(k) = \frac{\sum_{x=1}^{k} hist(x)}{\sum_{x=1}^{K} hist(x)} \times 255 \qquad (1)$$

Herein $F(k)$ is the gray level of the pixel whose gray level is equal to k after adjusted, K is the maximum gray level, $hist(x)$ is the number of pixels whose gray level is equal to x. It can be noted from the above mathematic equation (1) that, division has to be used in the prior art of the image adjustment method so as to obtain the gray level of the pixels after adjusted. That means, in the prior art, a complicated calculation and an expensive cost of hardware circuit is required to accomplish the image adjustment method.

SUMMARY OF THE INVENTION

The present invention provides a plurality of image adjustment methods capable to adequately and flexibly apply the gray level range to execute the image adjustment.

The present invention provides an image adjustment method, the method includes the steps: first, an image data is received, wherein the image data has a plurality of original pixels, the number of the original pixels is Num1, and $2^{N-1} \leq Num1 \leq 2^{N}-1$, wherein N and Num1 are natural numbers. Then, a plurality of expanding pixels are added to the image data, so that the sum of the original pixels and the expanding pixels is equal to $2^{N}-1$. After that, a plurality of cumulative pixel numbers corresponding to a plurality of gray levels are calculated, wherein the cumulative pixel numbers are not larger than a total number of the original pixels corresponding to each of the gray levels and the expanding pixels. And then the gray levels of the original pixels are adjusted according to correlations between the gray levels and the total number of the cumulative pixels.

The present invention provides another method for image adjustment, the method includes the steps: first, an image data is received. A first cumulative histogram is obtained according to a plurality of pixels of the image data. The cumulative histogram represents the correlation between the gray levels of the pixels and the total number of the cumulative pixels. Then, the first cumulative histogram is shaped according to a first maximum cumulative total number corresponding to a greatest gray level of the first cumulative histogram, so as to obtain a second cumulative histogram, wherein a second maximum cumulative total number corresponding to the greatest gray level of the second cumulative histogram is equal to $2^{N}-1$, N is a positive integer, wherein N is a location of the most significant bit of the first maximum cumulative total number. And then, the gray levels of the pixels are adjusted according to the second cumulative histogram.

In light of the above, through the utility of the expanding pixels into the image data and making the total pixels of the original pixels of the image data and the increased expanding pixels equal to $2^{N}-1$, the corresponding correlation of the corresponding total number of the cumulative pixels and each gray level can be easily used to execute the adjustment of the gray level of the original pixels. On the other hand, the cumulative histogram of the image data can also be shaped so as to make the second maximum total number of cumulative pixels corresponding to the maximum gray level of the renewed cumulative histogram equal to $2^{N}-1$. Thus, all the gray levels which are able to be used can be used to display the image, and it can further improve the quality of the display image.

In order to make the aforementioned and other objects, features and advantages of the disclosure comprehensible, embodiments accompanied with figures are described in detail below.

BRIEF DESCRIPTION OF THE DRAWINGS

The accompanying drawings constituting a part of this specification are incorporated herein to provide a further understanding of the invention. Here, the drawings illustrate embodiments of the invention and, together with the description, serve to explain the principles of the invention.

DETAILED DESCRIPTION OF DISCLOSED EMBODIMENTS

Figure 1:
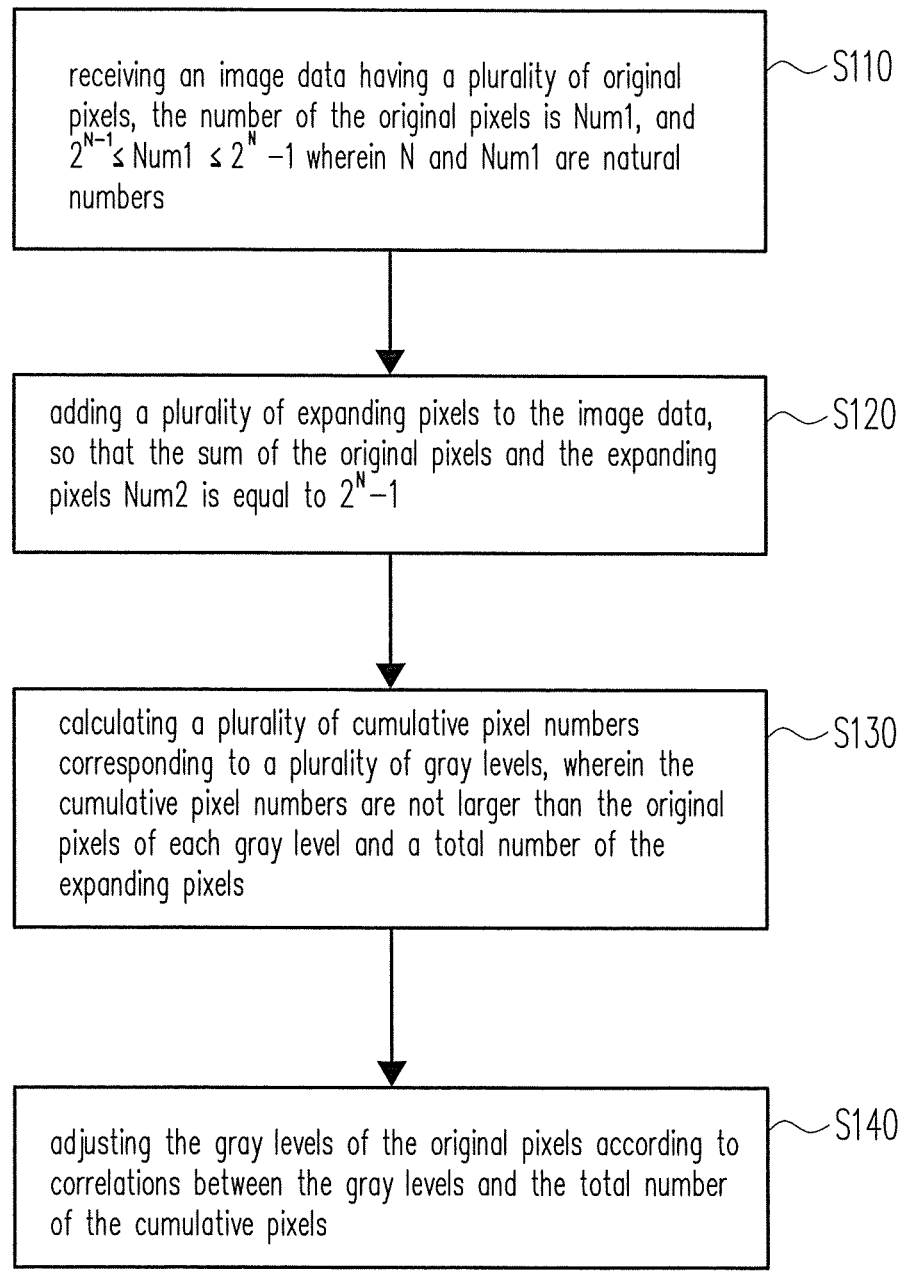
FIG. 1 is a flow chart showing an image adjustment method according to an embodiment of the present invention.

Referring to FIG. 1, FIG. 1 is a flow chart showing an image adjustment method according to an embodiment of the present invention. In the present embodiment, the image adjustment method includes the steps: first, an image data is received, wherein the image data has a plurality of original pixels, the number of the original pixels is Num1, and $2^{N-1} \leq Num1 \leq 2^{N}-1$, wherein N and Num1 are natural numbers (S110). Then, a plurality of expanding pixels are added to the image data, so that the sum of the original pixels and the expanding pixels is equal to $2^{N}-1$ (S120).

Herein Num1 of the original pixels can be obtained from the resolution of the image data. Taking an image data with a resolution of 1280×1024 as an example, the number of original pixels Num1 is equal to 1310720. Since the number of original pixels Num1 (=1310720) is between $2^{20}$ (=1048576) and $2^{21}$ (=2097152), N=21, and the sum of the number of original pixels and the expanding pixels Num2 is equal to $2^{21}$ −1=2097151. And thus, the number of expanding pixels to be added is equal to 2097151−1310720=786431.

Figure 2A:
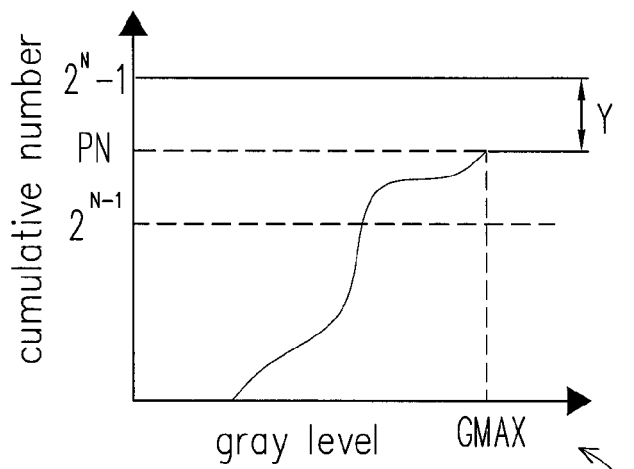
FIG. 2A to 2C illustrate the sequence of process of the image adjustment method according to the embodiment of the present invention.
Figure 2B:
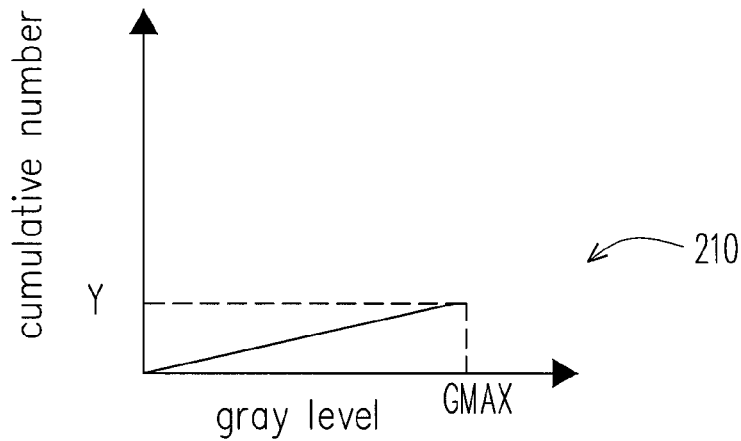
Figure 2C:
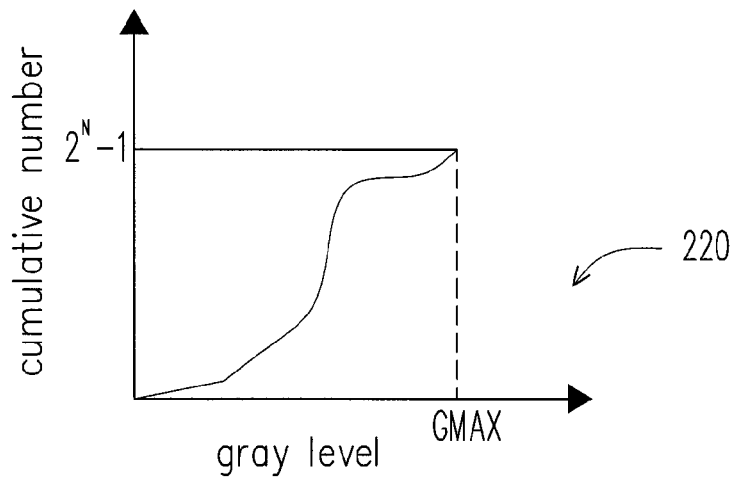

Referring to FIG. 2A to 2C illustrate the sequence of process of the image adjustment method according to the embodiment of the present invention. First, as shown in FIG. 2A, the cumulative histogram 200 is made according to the original pixels of the image data. The cumulative histogram 200 represents the correlation between the gray levels of the pixels and the total number of the cumulative pixels. The maximum gray level GMAX corresponding to the maximum cumulative total number PN is the total number of the original pixels. It should be noted that, the maximum cumulative total number PN is between $2^{N−1}$ and $2^{N}−1$, and the difference Y between the maximum cumulative total number PN and $2^{N−1}$ is the number of the expanding pixels to be added.

After the number of the expanding pixels Y is obtained, the expanding pixels can be averagely divided to correspond to each gray level 1 to GMAX. More specifically, if the number of the expanding pixels Y=510, and the maximum gray level GMAX=255, then the expanding pixels are averagely divided and added into the image data by means of each gray level is corresponding 2 of expanding pixels. Referring to FIG. 2B, the cumulative histogram 210 is made according to the expanding pixels. The maximum cumulative total number corresponding to the maximum gray level GMAX in the cumulative histogram 210 is equal to Y. In addition, when the expanding pixels are averagely divided to correspond to each gray level, the cumulative histogram 210 is a linearly increasing straight line.

After adding the expanding pixels regarding the display image, the cumulative histogram 220 made according to the original pixels and the expanding pixels is illustrated in FIG. 2C. Then, referring to FIG. 2C and FIG. 1, after the step S120, calculating of a plurality of cumulative pixel numbers corresponding to each gray level can be executed through FIG. 2C (S130). Through the correlation between cumulative pixel numbers corresponding to each gray level, the adjustment of the gray levels of the original pixels of the image data can be executed (S140). In other words, by using the cumulative histogram 220 of FIG. 2C obtained by adding the expanding pixels, the gray levels of the original pixels of the image data can be adjusted and the original pixels after adjusted can further be displayed with a larger color range so as to improve the display quality.

It should be noted that, after the expanding pixels are added and when the histogram equalization method of the image data is executed to generate gamma parameter data, the denominator of the applied mathematic equation (1) is equal to $2^{N}−1$. Therefore, when the gray level after adjusted F(k) is calculated, it is just required to discard the smallest number of bits N of the numerator, and just to take the greatest number of bits M of the numerator, wherein M is a positive integer and M≤N, the division is not required and thus the cost for the hardware circuit can be effectively saved.

Figure 3A:
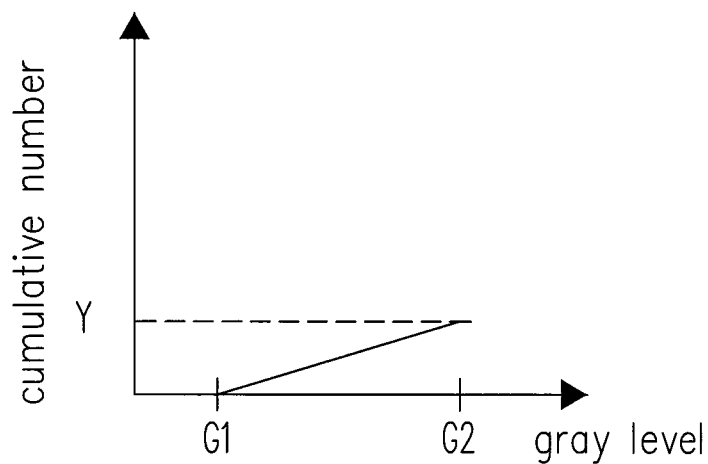
FIGS. 3A and 3B illustrate another sequence of process of the image adjustment method according to the embodiment of the present invention.
Figure 3B:
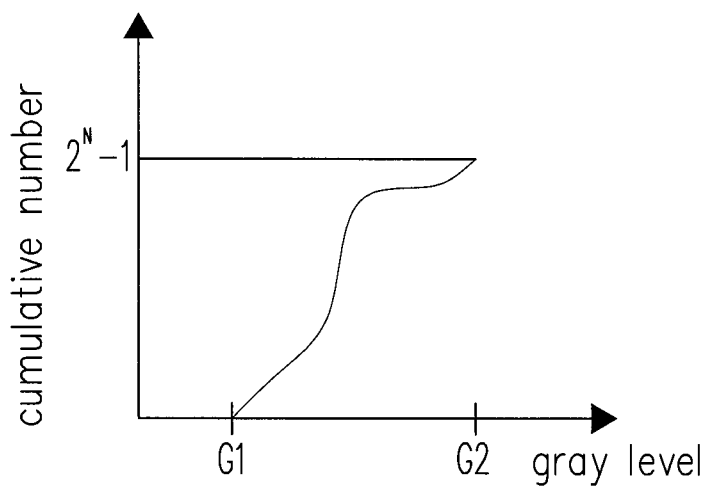

Referring to FIG. 3A and FIG. 3B, FIGS. 3A and 3B illustrate another sequence of process of the image adjustment method according to the embodiment of the present invention. Herein the expanding pixels are not required to be averagely distributed to correspond to all the possible gray levels. Referring to FIG. 3A, herein when the gray levels of the original pixels are distributed in the region of gray levels with the gray levels G1 to G2, the expanding pixels can be averagely distributed to the corresponding region of gray levels with the gray levels G1 to G2. In this way, after the expanding pixels are added, the resulted cumulative histogram according to the original pixels and the expanding pixels is as illustrated in FIG. 3B.

Figure 4A:
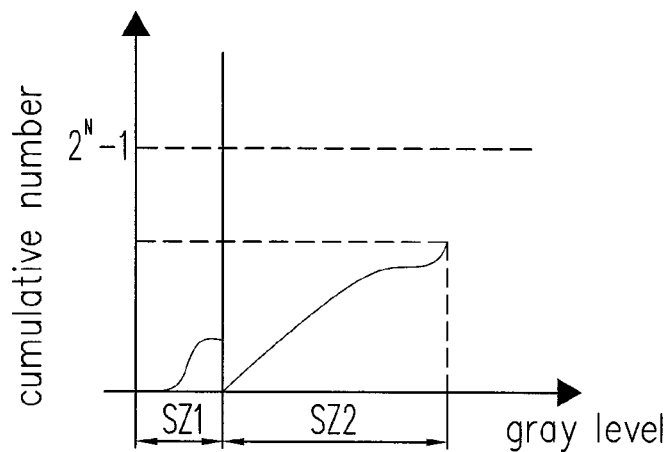
FIG. 4A to 4C further illustrate another sequence of process of the image adjustment method according to the embodiment of the present invention.
Figure 4B:
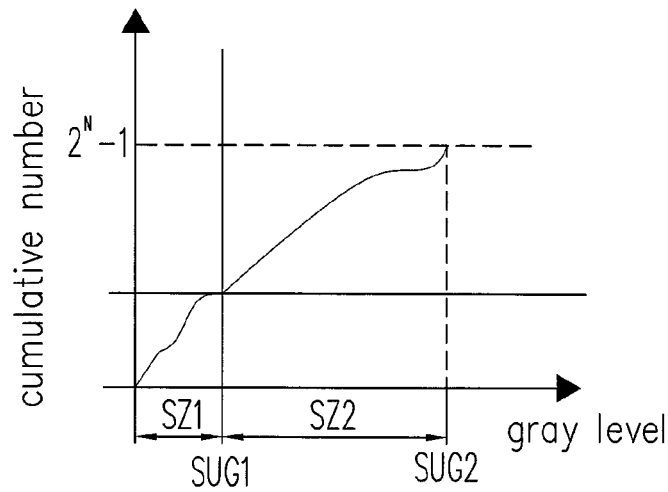
Figure 4C:
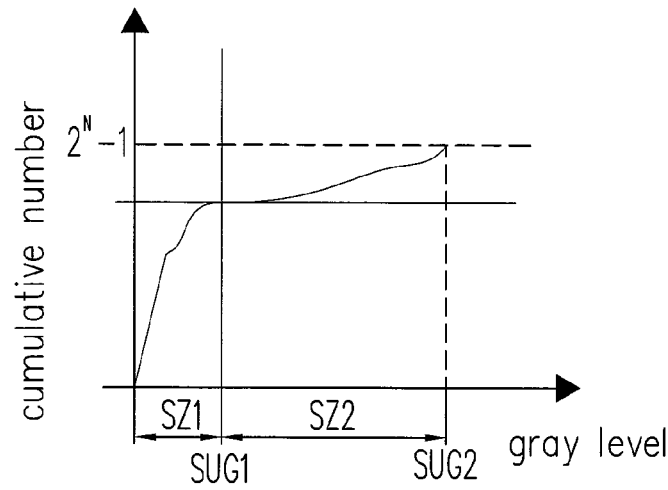

Referring to FIG. 4A to 4C, FIG. 4A to 4C further illustrate another sequence of process of the image adjustment method according to the embodiment of the present invention. Referring to FIG. 4A first, in the embodiment, the original pixels can be divided into a plurality of gray level sub regions SZ1 and SZ2 according to the sizes of the gray levels of the original pixels. And the resulted cumulative histogram obtained by the separately calculation of the gray level sub region SZ1 and SZ2 is as shown in FIG. 4A. In the adding process of expanding pixels, it can be executed to the gray level sub region SZ1 or the gray level sub region SZ2, or all of the expanding pixels can be divided into certain proportions and individually added into the gray level sub region SZ1 and the gray level sub region SZ2. And for the proceeding adjustment process of each gray level sub region, the executing method is similar to the single gray level region illustrated in FIG. 1, FIG. 2A to 2C and FIG. 3A to 3B, and the linear term to be added into each gray level sub region can be the same or different.

For example, after all of the expanding pixels are added into the gray level sub region SZ2, the resulted cumulative histogram of the original pixels and the expanding pixels is as illustrated in FIG. 4B. Relatively, after all of the expanding pixels are added into the gray level sub region SZ1, the resulted cumulative histogram of the original pixels and the expanding pixels is illustrated in FIG. 4C. In the above mentioned method, the image data can be adjusted directed to the high brightness region or low brightness region of the display image according to the user requirement or the feature of display image, so as to obtain an adjusted display image which meets the requirements.

Moreover, in the cumulative histogram of the original pixels and the expanding pixels of FIGS. 4B and 4C, the maximum sub cumulative pixel total number corresponding to the maximum gray level SUG1 of the gray level sub region SZ1 is $2^{N(1)}−1$, the maximum sub cumulative pixel total number corresponding to the maximum gray level SUG2 of the gray level sub region SZ2 is $2^{N(2)}−1$, wherein both N(1) and N(2) are positive integers, and N(1) is smaller than N(2), and N(1) is a location of the most significant bit of the maximum sub cumulative pixel total number of the gray level sub region SZ1 and N(2) is a location of the most significant bit of the maximum sub cumulative pixel total number of the gray level sub region SZ2.

Additionally, besides the above mentioned adjustment method of adding the expanding pixels to make the total number of the original pixels and the expanding pixels of the image data equal to $2^{N}−1$, the gray level of the original pixel after adjusted can also be obtained by commonly multiplying a gain term to the gray level of the original pixels. And for the condition of a plurality of gray level sub regions being divided into, the gain term of each gray level sub region can be set to be the same or different according to the requirement.

In the embodiment of the image adjustment method, an image receiving device can be used to receive the image data, for example. The various calculating processes directed to the image data can be executed by an image processing unit coupled to the image receiving device, so as to obtain the correlation of the adjusted gray level and the cumulative pixel total number to adjust the display image.

Figure 5:
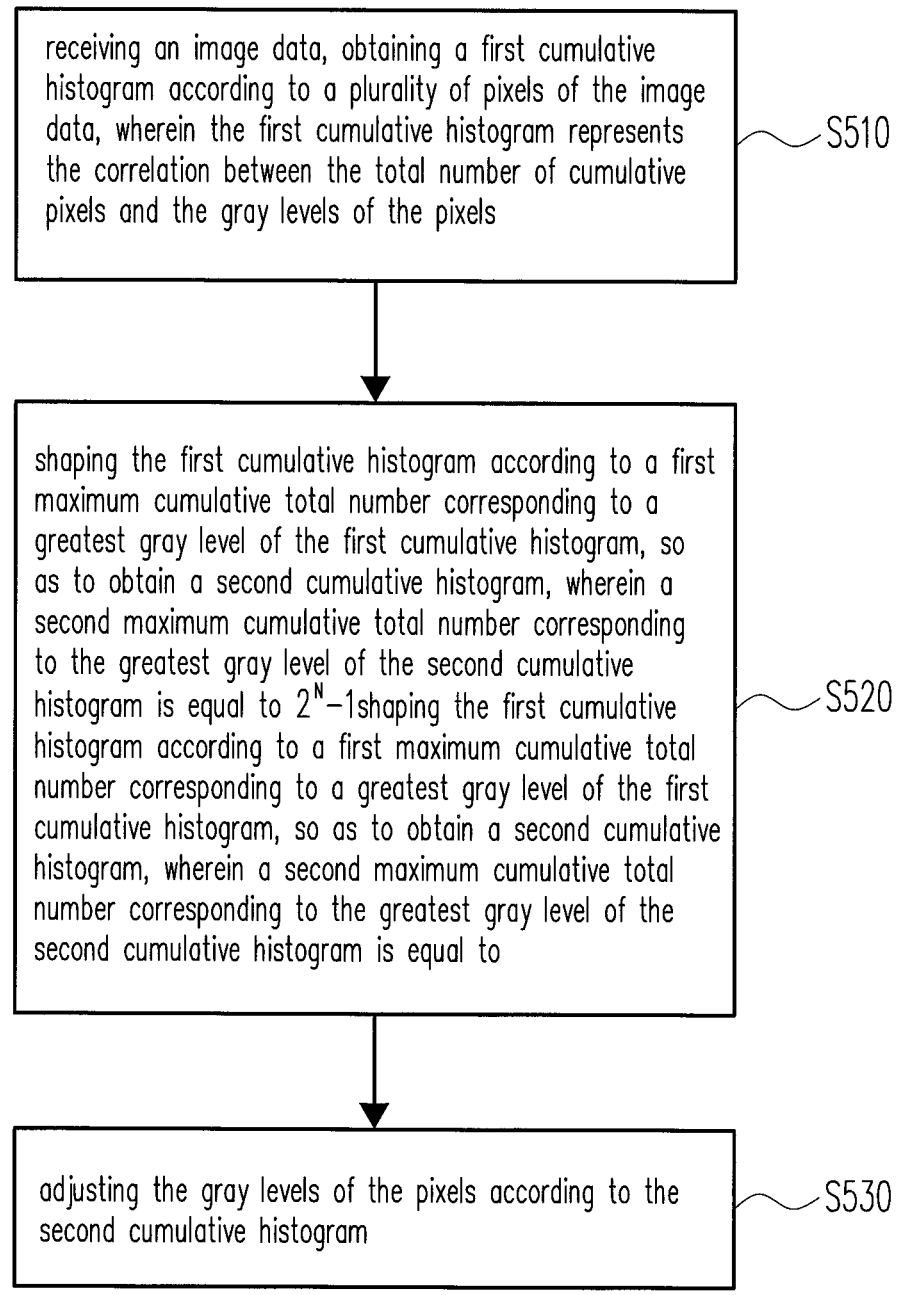
FIG. 5 is a flow chart showing an image adjustment method according to another embodiment of the present invention.

Referring to FIG. 5, FIG. 5 is a flow chart showing an image adjustment method according to another embodiment of the present invention. This embodiment is an image adjustment method with another viewpoint different from the embodiment in FIG. 1. Herein the method of the present embodiment includes the steps: first, an image data is received. A first cumulative histogram is obtained according to a plurality of pixels of the image data (S510). Herein the cumulative histogram represents the correlation between the gray levels of the pixels and the total number of the cumulative pixels. Then, the first cumulative histogram is shaped according to a first maximum cumulative total number corresponding to a greatest gray level of the first cumulative histogram, so as to obtain a second cumulative histogram (S520), wherein a second maximum cumulative total number corresponding to the greatest gray level of the second cumulative histogram is equal to $2^N-1$, N is a positive integer, wherein N is a location of the most significant bit of the first maximum cumulative total number. Finally, the gray levels of the pixels are adjusted according to the second cumulative histogram (S530).

The detailed illustrations of each step in the embodiment are described in above embodiments, and thus detail descriptions are not repeated hereinafter.

In light of the foregoing, in the embodiment of the present invention, the cumulative histogram of the original pixels of the image data can be shaped by means of adding the expanding pixels so as to make the maximum total number of cumulative pixels corresponding to the maximum gray level of the adjusted cumulative histogram equal to $2^N-1$. And the gray levels of the original pixels are adjusted by using the correlations between the gray levels of the adjusted cumulative histogram and the total number of the cumulative pixels. Thus, utility of a divider can be avoided in the calculation of gamma parameter data which is used to adjust the original pixels and the cost for the hardware can be effectively saved. Furthermore, much more colors of the display image can be applied to display and thus the display image quality can be improved.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. An image adjustment method comprising:
   receiving an image data, wherein the image data has a plurality of original pixels, the number of the original pixels is Num1, and $2^{N-1} \leq Num1 \leq 2^N-1$, wherein N and Num1 are natural numbers;
   adding a plurality of expanding pixels to the image data, so that the sum of the original pixels and the expanding pixels is equal to $2^N-1$; and
   calculating a plurality of cumulative pixel numbers corresponding to a plurality of gray levels, for generating a plurality of gamma parameter data, wherein the cumulative pixel numbers are not larger than a total number of the original pixels corresponding to each of the gray levels and the expanding pixels;
   adjusting the gray levels of the original pixels according to correlations between the gray levels and the total number of the cumulative pixels; and
   wherein the step of adding a plurality of expanding pixels comprising:
      adding a portion of the expanding pixels averagely corresponding to each gray level.

2. The image adjustment method as claimed in claim 1, the step of adding a plurality of expanding pixels comprising:
   determining whether the gray levels of the original pixels are distributed in a distribution region of the gray levels; and
   adding the expanding pixels averagely corresponding to the distribution region of each gray level.

3. The image adjustment method as claimed in claim 1, the step of adding a plurality of expanding pixels comprising:
   dividing the original pixels into a plurality of gray level sub regions according to the sizes of the gray levels of the original pixels; and
   adding the expanding pixels corresponding to at least one of the gray level sub regions.

4. The image adjustment method as claimed in claim 3, wherein the first gray level sub regions respectively have a maximum sub cumulative pixel total number corresponding to the maximum gray level, and after the expanding pixels are added into the original pixels, a plurality of second maximum sub cumulative pixel total numbers corresponding to the maximum gray levels are respectively equal to $2^{N(i)}-1$, N(i) is a positive integer, wherein N(i) is a location of the most significant bit of the first maximum sub cumulative pixel total number of the $i^{th}$ gray level sub region.

5. The image adjustment method as claimed in claim 1 further comprising:
   multiplying a gain item to the gray levels of the original pixels commonly, so as to obtain the gray levels of the original pixels after adjusted.

6. The image adjustment method as claimed in claim 1, wherein the step of adjusting the gray levels of the original pixels according to correlations between the gray levels and the total number of the cumulative pixels comprises:
   using each maximum M bit of the total numbers of cumulative pixels for generating the gamma parameter data, wherein M is a positive integer and $M \leq N$; and
   adjusting the gray levels of the original pixels according to the gamma parameter data.

7. An image adjustment method comprising:
   receiving an image data, obtaining a first cumulative histogram according to a plurality of pixels of the image data, wherein the first cumulative histogram represents the correlation between the total number of cumulative pixels and the gray levels of the pixels;
   shaping the first cumulative histogram according to a first maximum cumulative total number corresponding to a greatest gray level of the first cumulative histogram, so as to obtain a second cumulative histogram, wherein a second maximum cumulative total number corresponding to the greatest gray level of the second cumulative histogram is equal to $2^N-1$, N is a positive integer, wherein N is a location of the most significant bit of the first maximum cumulative total number; and
   adjusting the gray levels of the pixels according to the second cumulative histogram.

8. The image adjustment method as claimed in claim 7, the step of shaping the first cumulative histogram comprising:
   adding a linear term to the cumulative pixel total number of the first cumulative histogram.

9. The image adjustment method as claimed in claim 7, the step of shaping the first cumulative histogram comprising:
   determining a distribution region of gray level in which the pixels are distributed according to the first cumulative histogram; and
   adding a linear term to the cumulative pixel total number being in the distribution region of gray level of the first cumulative histogram.

10. The image adjustment method as claimed in claim 7, the step of shaping the first cumulative histogram comprising:

dividing the distribution region of gray level in which the pixels are distributed into a plurality of first gray level sub region according to the first cumulative histogram; and adding different linear term to the cumulative pixel total number being in the gray level sub region respectively.

11. The image adjustment method as claimed in claim 10, wherein the first gray level sub regions respectively have a maximum sub cumulative pixel total number corresponding to the maximum gray level, and a plurality of second maximum sub cumulative pixel total numbers corresponding to the maximum gray levels of the second cumulative histogram are respectively equal to $2^{N(i)}-1$, $N(i)$ is a positive number, wherein $N(i)$ is a location of the most significant bit of the first maximum sub cumulative pixel total number of the $i^{th}$ gray level sub region.

12. The image adjustment method as claimed in claim 7, further comprising:

multiplying a gain term to the cumulative pixel total number of the first cumulative histogram.

13. The image adjustment method as claimed in claim 7, further comprising:

using each maximum M bit of the cumulative pixel total numbers of the second cumulative histogram for generating a plurality of gamma parameter data, wherein M is a positive integer and $M \leq N$; and adjusting the gray levels of the pixels according to the gamma parameter data.

* * * * *